United States Patent [19]

Kusama et al.

[11] 4,145,480

[45] Mar. 20, 1979

[54] PHOTOGRAPHIC PAPER SUPPORT

[75] Inventors: You Kusama; Yoshinori Harikae, both of Tokyo, Japan

[73] Assignee: Mitsubishi Paper Mills, Ltd., Tokyo, Japan

[21] Appl. No.: 808,547

[22] Filed: Jun. 21, 1977

[30] Foreign Application Priority Data

Jun. 24, 1976 [JP] Japan ........................ 51-74772

[51] Int. Cl.² ........................ G03C 1/92; G03C 1/86; B32B 27/32; B32B 29/06

[52] U.S. Cl. ........................ 428/513; 96/45.1; 96/82; 96/85; 428/539; 428/917

[58] Field of Search ........................ 428/511, 513, 539, 917; 96/85, 87 R, 45.1, 67, 82

[56] References Cited

U.S. PATENT DOCUMENTS

| | | | |
|---|---|---|---|
| 3,009,416 | 11/1961 | Frasher et al. | 428/513 X |
| 3,501,298 | 3/1970 | Crawford | 96/85 |
| 3,561,992 | 2/1971 | Breidthardt | 428/513 X |
| 3,676,175 | 7/1972 | Woodward et al. | 428/539 X |
| 3,776,761 | 12/1973 | Kato et al. | 428/539 X |
| 3,911,191 | 10/1975 | Guastella et al. | 428/513 X |
| 3,914,522 | 10/1975 | Saverin et al. | 428/513 |
| 4,042,398 | 8/1977 | Holm | 428/513 X |

*Primary Examiner*—Harold Ansher

*Attorney, Agent, or Firm*—Cushman, Darby & Cushman

[57] ABSTRACT

A polyolefin layer carried on at least one surface of a polyolefin resin coated paper for use as a photographic paper support, contains a titanium oxide composition comprising 20–60 parts by weight of a rutile-type titanium oxide and 40–80 parts by weight of an anatase-type titanium oxide per 100 parts by weight of the titanium oxide composition. Such polyolefin resin coated paper is excellent in hiding power, resolving power, light resistance, whiteness, fading resistance, etc.

9 Claims, No Drawings

PHOTOGRAPHIC PAPER SUPPORT

BACKGROUND OF THE INVENTION

This invention relates to a photographic paper support and more particularly it is concerned with a polyolefin resin coated paper which contains, in the polyolefin layer on at least one surface thereof, a specific white pigment and, if necessary, a fluorescent brightening agent, a colored pigment, etc. General photographic paper supports are baryta paper comprising a base paper having coated thereon a barium sulfate layer, paper supports comprising a base paper having coated on both surfaces polyolefin resin layers, etc. Important properties required for photographic paper supports are dimensional stability, hiding power, whiteness, moisture resistance, no adverse effect on photographic emulsion layers, etc. Generally, white pigments are contained in the polyolefin layer of polyolefin resin coated papers and as the white pigments, ordinarily titanium oxide, especially rutile-type titanium oxide has been used. This is because the rutile-type titanium oxide has higher hiding power and light resistance as compared with zinc white, lithopone or white lead, and is nontoxic. However, rutile-type titanium oxide is insufficient in whiteness for photographic paper and easily absorbs ultraviolet ray to become yellowish. On the other hand, anatase-type titanium oxide is lower than rutile-type titanium oxide in hiding power for photographic paper and so is inferior in resolving power. Furthermore, the anatase-type titanium oxide when used with a fluorescent brightening agent is inferior in light resistance and results in great fading of color.

SUMMARY OF THE INVENTION

We have now found that when a titanium oxide composition comprising, on the basis of 100 parts by weight of the composition, 20–60 parts by weight of rutile-type titanium oxide and 40–80 parts by weight of anatase-type titanium oxide, preferably 25–40 parts by weight of rutile-type titanium oxide and 60–75 parts by weight of anatase-type titanium oxide is contained in the polyolefin resin of a photographic paper support comprising a base paper both sides of which are coated with the polyolefin resin the resultant polyolefin coated paper has substantially the same hiding power, resolving power and light resistance and fading resistance (in the case of jointly using a fluorescent brightening agent) as polyolefin coated paper which contains titanium oxide composition comprising only rutile-type titanium oxide and furthermore said polyolefin coated paper has substantially the same whiteness and the same less yellowish staining and the same bright color (in the case of joint use of colored pigment) as polyolefin coated paper containing a titanium oxide composition comprising only anatase-type titanium oxide.

DESCRIPTION OF THE INVENTION

Polyolefins used in this invention include polyethylene, polypropylene, polyisobutylene, etc., copolymers mainly composed of ethylene and propylene and mixtures thereof. Rutile-type titanium oxides used in this invention are alumina-treated rutile-type titanium oxide, alumina-untreated rutile-type titanium oxide and mixtures thereof. Anatase-type titanium oxides used in this invention are alumina-treated anatase-type titanium oxide, alumina-untreated anatase-type titanium oxide and mixtures thereof.

The rutile-type titanium oxide and the anatase-type titanium oxide are contained in the polyolefin resin in an amount of 20–60 parts by weight, preferably 25–40 parts by weight and 40–80 parts by weight, preferably 60–75 parts by weight per 100 parts by weight of the total amount, i.e., the titanium oxide composition, respectively. For example, when anatase-type titanium oxide treated with hydrous alumina is contained in an amount of more than 80 parts by weight per 100 parts by weight of the titanium oxide composition, the resultant polyethylene coated paper is inferior to polyethylene coated paper containing only rutile-type titanium oxide treated with hydrous alumina in hiding power and resolving power. Moreover, due to the inferior hiding power the base paper is quite faded and is inferior in light resistance. When anatase-type titanium oxide not treated with hydrous alumina or a mixture thereof with anatase-type titanium oxide treated with hydrous alumina is used in place of said anatase-type titanium oxide treated with hydrous alumina, the hiding power, resolving power and light resistance are further deteriorated. When rutile-type titanium oxide treated with hydrous alumina is contained in an amount of more than 60 parts by weight per 100 parts by weight of the titanium oxide composition, the resultant polyethylene coated paper is low in whiteness and is yellowish because of its easy absorption of ultraviolet rays as compared with polyethylene coated paper containing only anatase-type titanium oxide treated with hydrous alumina. Similar results are obtained when in place of said rutile-type titanium oxide treated with hydrous alumina a rutile-type titanium oxide not treated with hydrous alumina or a mixture thereof with rutile-type titanium oxide treated with hydrous alumina is used. A polyethylene coated paper which contains anatase-type titanium oxide treated with hydrous alumina in an amount of 40–80 parts by weight, preferably 60–75 parts by weight per 100 parts by weight of the titanium oxide composition in accordance with this invention has substantially the same whiteness as a polyethylene coated paper containing only anatase-type titanium oxide treated with hydrous alumina, has little yellowish color, and is good in hiding power, resolving power and light resistance and furthermore has substantially the same hiding power, resolving power and light resistance as a polyethylene coated paper containing only rutile-type titanium oxide treated with hydrous alumina. Thus, the polyethylene coated paper of this invention overcomes the defects of the conventional polyethylene coated paper and is extremely preferred as photographic paper supports. Furthermore, if necessary, fluorescent brightening agents may be contained in polyolefin resin. There are various fluorescent brightening agents such as stilbene type, imidazole type, carbostyrile type, oxadiazole type, cumarin type, triazole type, carbazole type, imidazolone type, etc. and a suitable one may be optionally chosen among them. Especially suitable fluorescent brightening agents are those which are stable at a temperature higher than 200° C., e.g., those which have been used for incorporation into resins because polyolefin becomes molten by heating it to a temperature higher than 200° C. Examples of these especially suitable fluorescent brightening agents are dialkylamino cumarin, bisdimethylamino stilbene, bisbenzoxazolylethylene, 4-alkoxy-1,8-naphthalenedicarboxylic acid-N-alkylimide, dialkylstilbene, etc. The fluorescent brightening agent may be added in an amount of about 0.01–6% by weight of polyolefin and the amount may be optionally chosen depending on the properties of the fluorescent brightening agent and desired properties of paper. For example, when anatase-type titanium oxide treated with hydrous alumina is contained in an amount of more than 80 parts by weight per 100 parts by weight of the titanium oxide composition and a fluorescent brightening agent is additionally contained, the resultant polyethylene coated paper is markedly reduced in fluorescence when treated by Fade-Ometer and is inferior in light resistance to a polyethylene coated paper containing only a rutile-type titanium oxide treated with hydrous alumina and additionally containing a fluorescent brightening agent. When a rutile-type titanium oxide treated with hydrous alumina is contained in an amount of more than 60 parts by weight per 100 parts by weight of the titanium oxide composition and additionally a fluorescent brightening agent is contained, the resultant polyethylene coated paper exhibits a smaller effect of the fluorescent brightening agent than a polyethylene coated paper containing only an anatase-type titanium oxide treated with hydrous alumina and additionally containing the fluorescent brightening agent and a larger amount of a fluorescent brightening agent is required for obtaining the same fluorescence.

Furthermore, in order to obtain the same whiteness when observed with the naked eyes, a further larger amount of the fluorescent brightening agent must be used. Moreover, the whiteness attainable by such titanium oxide composition has a limit and the polyethylene coated paper becomes yellowish with addition of fluorescent brightening agent in an amount more than a certain amount and the whiteness rather decreases. A polyethylene coated paper which contains an anatase-type titanium oxide treated with hydrous alumina in an amount of 40–80 parts by weight, preferably 60–75 parts by weight per 100 parts by weight of the titanium oxide composition and additionally contains a fluorescent brightening agent according to this invention has substantially no great difference in loss of fluorescence when treated by a fade-o-meter and so substantially no difference in light resistance from a polyethylene coated paper which contains only a rutile-type titanium oxide treated with hydrous alumina and additionally contains a fluorescent brightening agent. Furthermore, said polyethylene coated paper of this invention has substantially the same effects of the fluorescent brightening agent as a polyethylene coated paper containing only an anatase-type titanium oxide and a fluorescent brightening agent and substantially the same amount of the fluorescent brightening agent may be used for obtaining the same fluorescent intensity. In order to obtain the same whiteness when observed with the naked eyes, also substantially the same amount of the fluorescent brightening agent may be used. Thus, the polyethylene coated paper of this invention is excellent in light resistance when a fluorescent brightening agent is contained in the polyethylene resin and the effects of the fluorescent brightening agent are also high.

If necessary, colored pigments may be contained in the polyolefin resin layer in this invention. Any colored pigments which are ordinarily used can be used, but those which are high in heat stability are preferred because polyolefins are made molten by heating them at higher than 200° C. Examples of blue pigments are ultramarine blue, Berlin blue, cobalt blue, Phthalocyanine Blue, Manganese Blue, cerulean, tungsten blue, molybdenum blue, Anthraquinone Blue, Indathrene Blue, etc. If necessary, yellow pigments such as cadmium yellow, red pigments, purple pigments, orange pigments, green pigments, etc. or mixtures thereof may be used. The colored pigments may be used in an amount of 0.001–1% by weight of the polyolefin. For example, a polyethylene coated paper which contains a rutile-type titanium oxide treated with hydrous alumina in an amount of more than 60 parts by weight per 100 parts by weight of titanium oxide composition and additionally contains a blue pigment is inferior in brightness of blue to a polyethylene coated paper which contains an anatase-type titanium oxide treated with hydrous alumina and a blue pigment. The polyethylene coated paper of this invention which contains a rutile-type titanium oxide treated with hydrous alumina in an amount of 20–60 parts by weight, preferably 25–40 parts by weight, per 100 parts by weight of titanium oxide composition has substantially the same bright blue tone as a polyethylene coated paper containing only an anatase-type titanium oxide treated with hydrous alumina to which a blue pigment is added. Furthermore, if necessary, zinc white, clay, kaolin, calcium carbonate, white lead, zirconium oxide, etc. may be added in a suitable amount. Moreover, known internal antistatic agent, antioxidant and lubricant may be used in a suitable amount.

Masterbatches of the rutile-type titanium oxide and the anatase-type titanium oxide are prepared and they are diluted with polyolefin resin at the time of use. The rutile-type titanium oxide and the anatase-type titanium oxide may be blended as follows: That is, masterbatches of these titanium oxides are separately prepared and blended at the time of extrusion coating or a masterbatch containing both titanium oxides is prepared from the first. Furthermore, addition of fluorescent brightening agent or colored pigment can be effected by preparing a masterbatch of the fluorescent brightening agent alone of colored pigment alone and adding it at the time of extrusion coating or adding it in the desired amount to the masterbatch containing the titanium oxides. Concentration of titanium oxide in the masterbatch is desirably 25–50% by weight of the polyolefin.

The masterbatch may be prepared by any conventional methods. For example, melt blending with use of kneading extruder, heating and kneading roll, "Banbury" mixer, kneader, etc. is the most suitable. At the preparation of the masterbatches a suitable dispersant such as sorbitan esters may be used for increasing dispersibility of titanium oxide in polyolefin.

This invention is illustrated by the following examples.

Measurements of the properties in the examples were effected as follows:

Whiteness: Samples were irradiated with white light of a tungsten lamp and reflection intensity of reflected light of 440 nm in wavelength was measured by Spectrophotometer 39 manufactured by HITACHI LIMITED. The measured value was the desired whiteness. In this case the reflection intensity of standard white plate (MgO) was taken as 100%.

Opacity: Opacity of polyethylene coated paper was measured in accordance with the method of JIS P8138.

Light resistance: Sample was treated by Standard Fade-O-Meter manufactured by Toyo Rika Kogyo K.K. and whiteness of the sample before and after said treatment was measured by the method mentioned hereinabove.

Resolving power: After coating a photographic emulsion on the polyethylene coated paper, a resolving power chart was printed thereon and the printed chart was observed.

EXAMPLE 1

A low density polyethylene having a density of 0.92 g/cm$^3$ was coated to a thickness of 40μ on the back surface of a photographic base paper having a basis weight of 180 g/m$^2$ at 300° C. by extrusion coating method. On the top surface of said photographic base paper was coated a low density polyethylene having a density of 0.92 g/cm$^3$ and containing 10% by weight of titanium oxides in a thickness of 35μ.

Whiteness and opacity of the resultant polyethylene coated papers are shown in Table 1.

Table 1

| Sample No. | Anatase : Rutile (part by weight) | Whiteness | Opacity |
|---|---|---|---|
| 1 | 100 : 0 | 94.2 | 95.2 |
| 2 | 90 : 10 | 94.0 | 95.8 |
| 3 | 70 : 30 | 93.9 | 96.5 |
| 4 | 20 : 80 | 92.1 | 96.6 |
| 5 | 0 : 100 | 91.3 | 96.7 |

From Table 1 it is clear that samples Nos. 4 and 5 were low in whiteness and samples Nos. 1 and 2 were low in opacity while sample No. 3 prepared by the method of this invention was high in both whiteness and opacity. A polyethylene coated paper higher in opacity provides higher resolving power when this is used as a photographic paper.

Observation of the samples by naked eyes shows that samples Nos. 1, 2 and 3 had sufficient whiteness as a photographic paper support while samples Nos. 4 and 5 were insufficient in whiteness and were yellowish. When each sample was coated with a photographic emulsion and then resolving power chart was printed thereon, samples Nos. 3, 4 and 5 had substantially the same high resolving power while samples Nos. 1 and 2 were inferior in resolving power. None of these samples showed adverse effect on the photographic emulsion layer.

Furthermore, each sample which was not coated with the photographic emulsion was treated with fade-o-meter for 5 hours and whiteness of the samples was measured. The results are shown in Table 2.

Table 2

| Sample No. | Whiteness before treatment | Whiteness after treatment | Decrement of whiteness |
|---|---|---|---|
| 1 | 94.2 | 92.2 | 2.0 |
| 2 | 94.0 | 92.2 | 1.8 |
| 3 | 93.9 | 93.1 | 0.8 |
| 4 | 92.1 | 91.4 | 0.7 |
| 5 | 91.3 | 90.7 | 0.6 |

It will be recognized from Table 2 that sample No. 3 of this invention showed substantially the same decrement of whiteness as that of samples Nos. 4 and 5, but decrements of samples Nos. 1 and 2 were much greater than those of samples No. 3, 4 and 5. Furthermore, it is clear that among the samples treated with fade-o-meter sample No. 3 had the highest whiteness and thus the polyethylene coated paper had excellent light resistance.

It will be understood from said results that the polyethylene coated paper of this invention is suitable as a photographic paper support.

EXAMPLE 2

In the same manner as in Example 1 the back surface of base papers was coated with polyethylene and the top surface was coated with a low density polyethylene having a density of 0.92 g/cm$^3$ and containing 10% by weight of titanium oxide comprising anatase-type titanium oxide treated with hydrous alumina and rutile-type titanium oxide treated with hydrous alumina in the same blending ratios as in Example 1 and 0, 0.06 and 0.12% by weight of fluorescent brightening agent. Whiteness of thus obtained polyethylene coated papers is shown in Table 3.

Table 3

| Sample No. | Amount of flourescent brightening agent added (% by weight/PE) | Whiteness | Increment of whiteness |
|---|---|---|---|
| 1 | 0 | 94.2 | — |
| 1-1 | 0.06 | 98.7 | 4.5 |
| 1-2 | 0.12 | 104.7 | 10.5 |
| 2 | 0 | 94.0 | — |
| 2-1 | 0.06 | 98.4 | 4.4 |
| 2-2 | 0.12 | 104.4 | 10.4 |
| 3 | 0 | 93.9 | — |
| 3-1 | 0.06 | 98.3 | 4.4 |
| 3-2 | 0.12 | 104.2 | 10.3 |
| 4 | 0 | 92.1 | — |
| 4-1 | 0.06 | 95.3 | 3.2 |
| 4-2 | 0.12 | 99.5 | 7.4 |
| 5 | 0 | 91.3 | — |
| 5-1 | 0.06 | 94.3 | 3.0 |
| 5-2 | 0.12 | 98.3 | 7.0 |

The fluorescent brightening agent used was bis(butylbenzoxazole)thiophene (Uvitex OB of CIBA GEIGY CO.). The increment of whiteness in Table 3 indicates the effect of the fluorescent brightening agent and shows the difference in whiteness of samples with and without the agent. From Table 3 it will be recognized that increase in whiteness of samples No. 4 series (No. 4. No. 4-1 and No. 4-2) and No. 5 series was small even if the fluorescent brightening agent was added, namely, effect of the fluorescent brightening agent was small while the effect was great in the case of sample No. 3 series and it was substantially the same as those in samples No. 1 series and 2 series.

When these samples were observed by naked eyes, the sequence of whiteness was as follows: 1-2, 2-2, 3-2 > 1-1, 2-1, 3-1, 4-2 > 5-2 > 4-1 > 1, 2, 3 5-1 > 4 > 5.

Even if the whiteness measured were the same, the whiteness observed by the naked eye was lower in the samples of No. 4 series and No. 5 series than those of No. 1 series, No. 2 series and No. 3 series. For example, sample No. 5-2 and sample No. 3-1 had a measured whiteness of 98.3, but the latter was white than the former when observed by the naked eye. Therefore, it will be recognized that effect of fluorescent brightening agent was further lower in samples No. 4 series and 5 series than in samples No. 1, 2 and 3 series when observed by naked eyes. Sample No. 3 series were substantially the same in whiteness as samples No. 1 series and 2 series when observed by naked eyes and it will be recognized that the effect of the fluorescent brightening agent in sample No. 3 series was great. Moreover, each sample was treated by fade-o-meter for 3 hours and whiteness was measured. The results are shown in Table 4.

Table 4

| Sample No. | Whiteness before treatment | Whiteness after treatment | Decrement of whiteness |
|---|---|---|---|
| 1 | 94.2 | 92.5 | 1.7 |
| 1-1 | 98.7 | 92.7 | 6.0 |
| 1-2 | 104.7 | 92.9 | 11.8 |
| 2 | 94.0 | 92.5 | 1.5 |
| 2-1 | 98.4 | 92.8 | 5.6 |
| 2-2 | 104.4 | 94.9 | 9.5 |
| 3 | 93.9 | 93.4 | 0.5 |
| 3-1 | 98.3 | 95.3 | 3.0 |
| 3-2 | 104.2 | 99.0 | 5.2 |
| 4 | 92.1 | 91.7 | 0.4 |
| 4-1 | 95.3 | 93.4 | 1.9 |
| 4-2 | 99.5 | 95.3 | 4.2 |
| 5 | 91.3 | 90.9 | 0.4 |
| 5-1 | 94.3 | 92.9 | 1.4 |
| 5-2 | 98.3 | 94.4 | 3.9 |

As is clear from Table 4, samples No. 1 series and 2 series were much lowered in fluorescent brightening ability due to the treatment by the fade-o-meter and decrement of whiteness was great. Therefore, samples No. 1 series and 2 series were inferior in light resistance. Sample No. 3 series showed no great difference in decrement of whiteness as compared with samples No. 4 series and 5 series and furthermore sample No. 3 series had the highest whiteness after treatment by fade-o-meter and was excellent in light resistance.

From the above results, the effect of the fluorescent brightening agent is high in the photographic paper support of this invention and moreover the support of this invention is excellent in light resistance and is the most suitable.

EXAMPLE 3

In the same manner as in Example 1 polyethylene was coated on the back surface of a base paper. On the top surface of said base paper was coated a low density polyethylene having a density of 0.92 g/cm$^3$ and containing 10% by weight of titanium oxides comprising anatase-type titanium oxide treated with hydrous alumina and rutile-type titanium oxide treated with hydrous alumina in the same blending ratios as in Example 1 and 0.075% by weight of ultramarine in a thickness of 35$\mu$.

The sample in which the blending ratio of the anatase-type and rutile-type titanium oxides was 70:30 was superior in brightness of blue color to those containing no anatase-type titanium oxide and those in which the blending ratio was 20:80 and moreover was substantially the same as those containing no rutile-type titanium oxide and those in which the blending ratio was 90:10.

What is claimed is:

1. A photographic paper support comprising a base paper both surfaces of which are coated with polyolefin resins, characterized in that at least one polyolefin resin layer contains titanium oxide composition which comprises 20–60 parts by weight of a rutile-type titanium oxide and 40–80 parts by weight of an anatase-type titanium oxide per 100 parts by weight of the titanium oxide composition.

2. A photographic paper support according to claim 1, wherein the titanium oxide composition is contained in an amount of 2–20 parts by weight per 100 parts by weight of the polyolefin resin.

3. A photographic paper support according to claim 1, wherein the polyolefin is polyethylene.

4. A photographic paper support according to claim 1, wherein the rutile-type and anatase-type titanium oxides are treated with hydrous alumina.

5. A photographic paper support according to claim 1, wherein the titanium oxide composition comprises 25–40 parts by weight of the rutile-type titanium oxide and 60–75 parts by weight of the anatase-type titanium oxide.

6. A photographic paper support according to claim 1, wherein a fluorescent brightening agent is contained in the polyolefin resin.

7. A photographic paper support according to claim 6, wherein the amount of the fluorescent brightening agent is about 0.01–6% by weight of the polyolefin.

8. A photographic paper support according to claim 1, wherein a colored pigment is contained in the polyolefin resin.

9. A photographic paper support according to claim 8, wherein the amount of the colored pigment is about 0.001–1% by weight of the polyolefin.

* * * * *